US012597164B2

(12) United States Patent
Lim et al.

(10) Patent No.: US 12,597,164 B2
(45) Date of Patent: Apr. 7, 2026

(54) OBJECT ESTIMATION APPARATUS AND METHOD

(71) Applicants: Hyundai Motor Company, Seoul (KR); Kia Corporation, Seoul (KR)

(72) Inventors: Hyerin Lim, Seoul (KR); Junsik An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 286 days.

(21) Appl. No.: 18/240,225

(22) Filed: Aug. 30, 2023

(65) Prior Publication Data

US 2024/0212209 A1 Jun. 27, 2024

(30) Foreign Application Priority Data

Dec. 23, 2022 (KR) ........................ 10-2022-0183549

(51) Int. Cl.
*G06T 7/80* (2017.01)
*G06T 7/60* (2017.01)
(52) U.S. Cl.
CPC .................. *G06T 7/80* (2017.01); *G06T 7/60* (2013.01); *G06T 2207/30196* (2013.01); *G06T 2207/30252* (2013.01)
(58) Field of Classification Search
CPC .... G06T 7/80; G06T 7/60; G06T 7/00; G06T 2207/30252; G06T 2207/30196
See application file for complete search history.

(56) References Cited

U.S. PATENT DOCUMENTS

| | | | |
|---|---|---|---|
| 8,233,045 | B2 | 7/2012 | Luo et al. |
| 10,928,508 | B2 | 2/2021 | Swaminathan |
| 2013/0002861 | A1 | 1/2013 | Mitsugi |
| 2019/0102868 | A1 | 4/2019 | Beric et al. |
| 2022/0076388 | A1 | 3/2022 | Nakano |
| 2022/0164578 | A1 | 5/2022 | Deng et al. |

FOREIGN PATENT DOCUMENTS

WO WO-0077503 A1 * 12/2000 ............. G01N 23/04

OTHER PUBLICATIONS

CN112766100A Machine English translation included (Year: 2021).*
CN112668460A Machine English translation included (Year: 2021).*
Maroli et al., Automated Rotational Calibration of Multiple 3D LIDAR Units for Intelligent Vehicles (Year: 2017).*

(Continued)

*Primary Examiner* — Vu Le
(74) *Attorney, Agent, or Firm* — Banner & Witcoff, Ltd.

(57) ABSTRACT

Disclosed herein object estimation apparatus and method. The object estimation apparatus according to an example of the disclosure includes a processor and a memory storing instructions that, when executed by the processor, cause the object estimation apparatus to recognize one or more key points set in one or more objects included in an image of an object photographed by a camera, calibrate the image and project a grid map onto the calibrated image, project vertical lines onto the grid map-projected image, and generate, based on the projected vertical lines and the one or more recognized key points, one or more occupied grid map region (OGRs) in the grid map.

20 Claims, 9 Drawing Sheets

VL

OGR

(56)  References Cited

OTHER PUBLICATIONS

Harakeh et al., Ground Segmentation and Occupancy Grid Generation Using Probability Fields (Year: 2015).*
Li et al., Occupancy Grid Mapping in Urban Environments from a Moving On-Board Stereo-Vision System (Year: 2014).*
Raghavender Sahdev, Free Space Estimation using Occupancy Grids and Dynamic Object Detection (Year: 2017).*
Free Space Estimation using Occupancy Grids and Dynamic Object Dectection (Year: 2017).*
Efficient Model Based Grid Intersection Detection for Single-Shot 3D Reconstruction (Year: 2021).*

* cited by examiner

KP

GKR

KP

GKP

VL

VL

OGR

OGR

GKP

OBJECT ESTIMATION APPARATUS AND METHOD

CROSS-REFERENCE TO RELATED APPLICATION(S)

This application claims the benefit of Korean Patent Application No. 10-2022-0183549, filed on Dec. 23, 2022, which application is hereby incorporated herein by reference.

TECHNICAL FIELD

The present disclosure relates to an apparatus and method for estimating object, and more particularly, to an object estimation apparatus and method capable of estimating a position and size of an object having a certain height from the ground.

BACKGROUND

In general, estimating a position of an object with a monocular camera refers to estimating an actual position of an image on a flat surface. In this case, a localization model based on calibration is used to estimate the position of an object.

However, in the case of an object with a height from the ground, a method for predicting an actual position from an image captured by a monocular camera has not been investigated. For example, a rear lamp of a vehicle has a certain height from the ground, it is not easy to predict its actual position from the image.

An indirect method is used to predict an actual position of an object by inferring a size occupied by the object in real space using a computer-aided design (CAD) model in a state where the location of a point where the object touches the ground is obtained.

Such an indirect method of predicting the actual position of an object has the disadvantage of being limited to a positional accuracy.

SUMMARY

The following summary presents a simplified summary of certain features. The summary is not an extensive overview and is not intended to identify key or critical elements.

According to the present disclosure, an object estimation apparatus may comprise a processor; a memory storing instructions that, when executed by the processor, cause the object estimation apparatus to: recognize one or more key points set in one or more objects included in an image of an object photographed by a camera; calibrate the image and project a grid map onto the calibrated image; project vertical lines onto the grid map-projected image; and generate, based on the projected vertical lines and the one or more recognized key points, one or more occupied grid map region (OGRs) in the grid map. The instructions, when executed by the processor, may further cause the object estimation apparatus to: project the grid map onto a location, of the image, corresponding to a ground of the image; and provide the projected grid map to a vehicle for driving.

The instructions, when executed by the processor, may further cause the object estimation apparatus to: set one or more ground key points, contacting the ground of the image, of the one or more key points; and based on a parameter associated with a model of the camera, the one or more ground key points, and the grid map, calculate a relational expression between: image coordinates of the grid map-projected image; and actual coordinates of the object photographed by the camera. Each of the vertical lines may be projected onto a point at which a horizontal line and a vertical line of the grid map intersect.

The instructions, when executed by the processor, may further cause the object estimation apparatus to set, based on a position where the vertical lines are in contact with one or more outermost key points arranged on the outermost part of the one or more recognized key points set in the one or more objects, the one or more OGRs in the grid map. Each of the one or more OGRs may be a region formed to include the one or more outermost key points.

The instructions, when executed by the processor, may further cause the object estimation apparatus to set one or more ground key points, contacting a ground of the image, of the one or more key points; and form the one or more OGRs in a circular shape having a predetermined diameter around midpoints of two of the one or more ground key points.

The instructions, when executed by the processor, may further cause the object estimation apparatus to form, based on a line extending from two ground key points, contacting a ground of the image, of the one or more key points, the one or more OGRs. Each of the one or more key points may be set at main points of the one or more objects.

According to the present disclosure, an object estimation method performed by a processor, the method may comprise recognizing one or more key points set in one or more objects included in an image of an object photographed by a camera; projecting a grid map onto the image; projecting vertical lines onto the grid map-projected image; generating, based on the projected vertical lines and the one or more recognized key points, one or more occupied grid map region (OGRs) in the grid map; and providing the projected grid map to a vehicle for driving.

The grid map may be projected onto a location, of the image, corresponding to a ground of the image. The recognizing the one or more key points may comprise setting one or more ground key points, contacting the ground of the image, of the one or more key points. The projecting the grid map may comprise projecting the grid map at a location, of the image, corresponding to the ground of the image.

The projecting the grid map may further comprise, based on a parameter associated with a model of the camera, the one or more ground key points, and the grid map, calculating a relational expression between: image coordinates of the grid map-projected image; and actual coordinates of the object photographed by the camera. Each of the vertical lines may be projected onto a point at which a horizontal line and a vertical line of the grid map intersect.

The one or more OGRs may be generated based on a position where the vertical lines are in contact with one or more outermost key points arranged on the outermost part of the one or more recognized key points set in the one or more objects. Each of the one or more OGRs may be a region formed to include the one or more outermost key points.

The recognizing the one or more key points may comprise setting one or more ground key points, contacting a ground of the image, of the one or more key points, and wherein each of the one or more OGRs has a circular shape with a predetermined diameter around midpoints of two of the one or more ground key points.

The recognizing the one or more key points may comprise setting one or more ground key points, contacting a ground of the image, of the one or more key points, and wherein each of the one or more OGRs is generated based on a line extending from two of the one or more ground key points. Each of the one or more key points may be set at main points of the one or more objects.

BRIEF DESCRIPTION OF THE DRAWINGS

These and/or other examples of the disclosure will become apparent and more readily appreciated from the following description, taken in conjunction with the accompanying drawings, in which.

DETAILED DESCRIPTION

Figure 1:
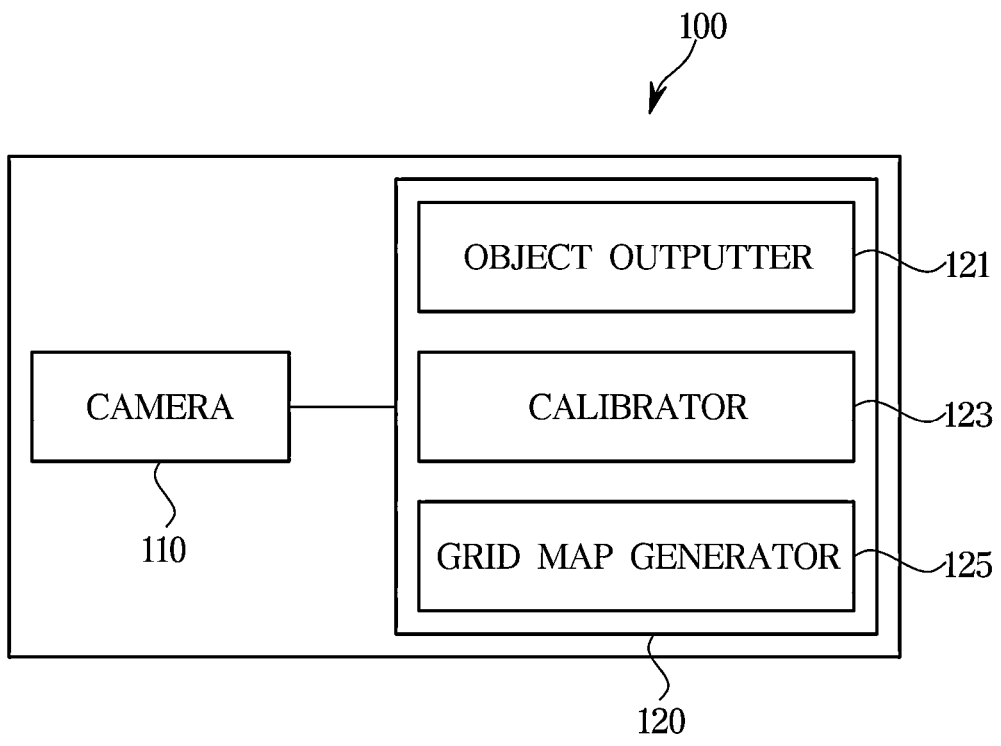
FIG. 1 shows an example of a block diagram of an object estimation apparatus.

Reference will now be made in detail to various examples of the disclosure. Examples of which are illustrated in the accompanying drawings, wherein like reference numerals refer to like elements throughout. This specification may not describe all elements of the disclosed example(s) and detailed descriptions of what is well known in the art or redundant descriptions on substantially the same configurations may be omitted. The terms 'part', 'module', 'member', 'block' and the like as used in the specification may be implemented in software and/or hardware, such as field-programmable gate array (FPGA)/application specific integrated circuit (ASIC). Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, various examples of the present disclosure will be described in detail with reference to the accompanying drawings.

Referring to FIG. 1 to FIG. 8, examples of an object estimation apparatus 100 will be described. The object estimation apparatus 100 may include a camera 110 and an image processor 120.

The camera 110 may be disposed at the front or rear end of a vehicle and photographs images of the surroundings of the vehicle. For example, the camera 110 may be a digital type monocular camera (e.g., a single lens camera).

The image processor 120 may process an image captured by the camera 110 and perform an operation for estimating a position and size of an object having a height from the ground in the captured image. The image processor 120 may include an object outputter 121, a calibrator 123, and a grid map generator 125.

Figure 2:
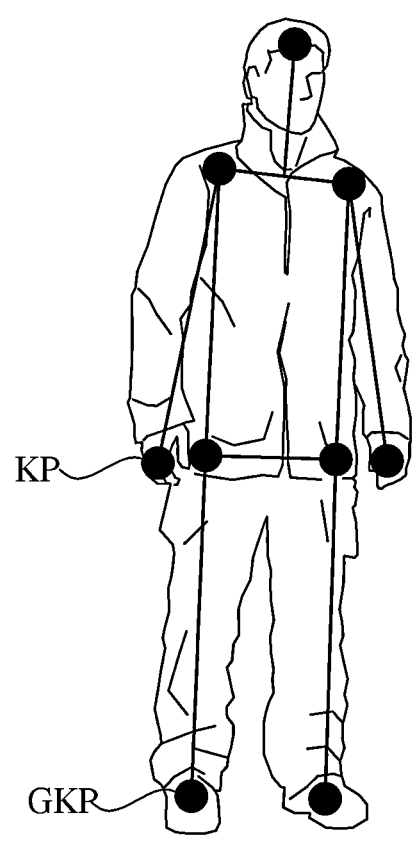
FIG. 2 shows an example of key points of a human body among 3D objects in an object estimation apparatus.
Figure 3:
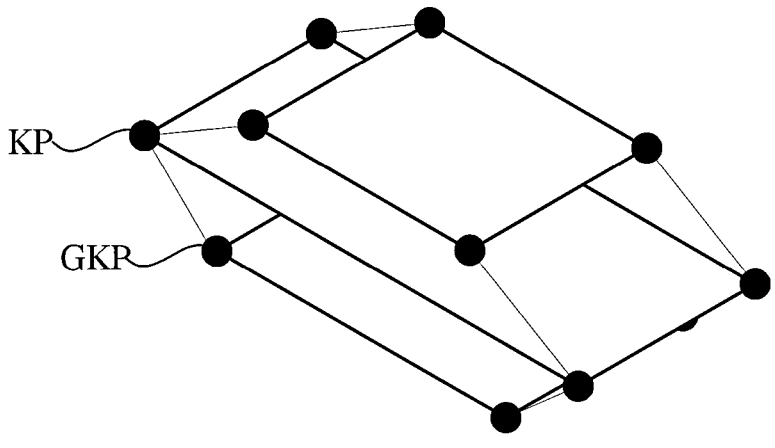
FIG. 3 shows an example of key points of a vehicle among 3D objects in an object estimation apparatus.

The object outputter 121 may recognize a key point (KP) of an object from an image captured by the camera 110. As shown in FIG. 2 and FIG. 3, a plurality of KPs for an object may be set for each object. The plurality of KPs may be set by finding main points according to an object type, and the number and structure of the KPs may be different. These KPs may use a KR recognition network.

For example, as shown in FIG. 2, nine KPs may be set for a human body, and the nine KPs may be set for the head, shoulders, hands, waist, and feet of the human body, respectively. In addition, as shown in FIG. 3, 12 KPs may be set for a vehicle, and for example, 4 KPs may be set at the top, 4 KPs at the middle, and 4 KPs at the bottom.

Furthermore, the object outputter 121 may find a key point that contacts the ground of the plurality of KPs set in the object, and then set the corresponding KP as a ground key point (GKP). For example, the number of GKPs for a human body may be two, and the number of GKPs for a vehicle may be four.

Figure 4:
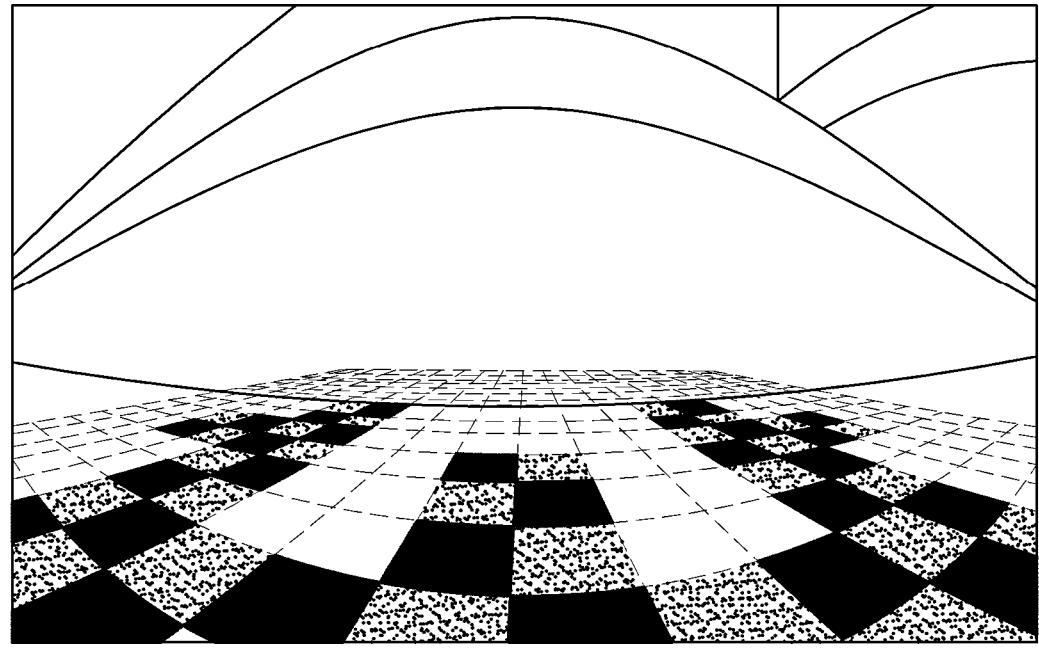
FIG. 4 shows an example of a screen on which a grid map is projected onto the ground by an object estimation apparatus.

The calibrator 123 may project a grid map onto a ground of an image captured by the camera 110. In other words, as shown in FIG. 4, the calibrator 123 may project a grid map onto a location of a three-dimensional (3D) image corresponding to a flat surface of the 3D image of one or more objects photographed by the camera 110. At this time, the calibrator 123 may project the grid map based on calibration methods. For example, the calibrator 123 estimates parameters of the camera 110.

The calibrator 123 may calculate image coordinates from the image captured by the camera 110 by using the GKPs of the object and the projected grid map. In addition, the calibrator 123 may calculate coordinates of an actual location of the object by calibrating the image captured by the camera 110.

Therefore, the calibrator 123 may calculate a relational expression between the image coordinates and the coordinates in an actual 3D space as shown in Equation 1.

$$s\begin{bmatrix} u \\ v \\ 1 \end{bmatrix} = \qquad\qquad \text{[Equation 1]}$$

$$\begin{bmatrix} f_x & skew\_cf_x & c_x \\ 0 & f_y & c_y \\ 0 & 0 & 1 \end{bmatrix}\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}\begin{bmatrix} X \\ Y \\ Z \\ 1 \end{bmatrix} = A[R|t]\begin{bmatrix} X \\ Y \\ Z \\ 1 \end{bmatrix}$$

Here, A is a unique parameter based on the camera 110 model, and the values of $r_{xy}$ and $t_x$ may be estimated through two calibration processes. In addition, u, v is the coordinates of the image, and X, Y, Z are the coordinates in the actual 3D space.

Figure 5:
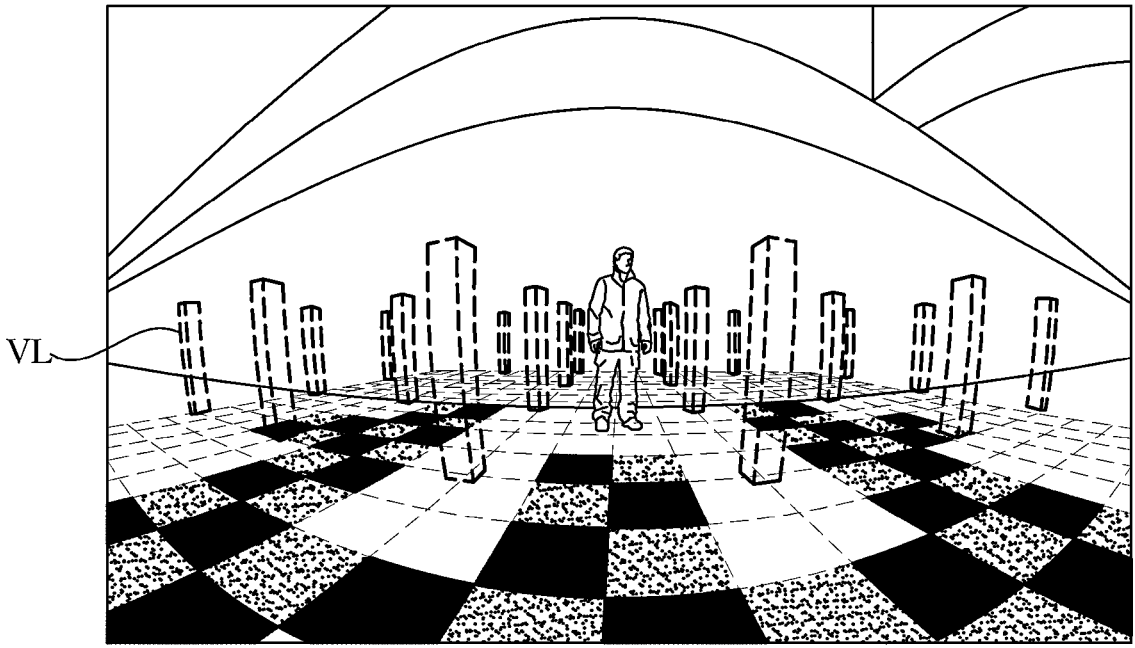
FIG. 5 shows an example of a screen on which a vertical line is generated and projected at a point of a grid map projected onto the ground by an object estimation apparatus.
Figure 6:
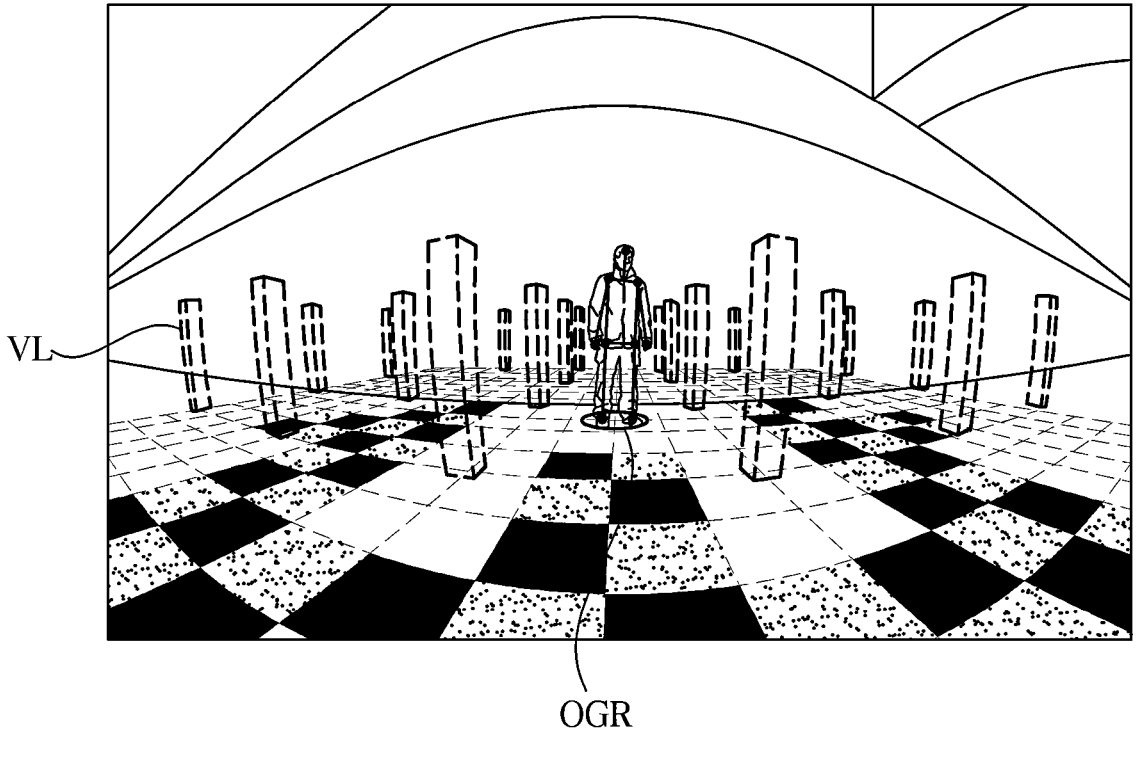
FIG. 6 shows an example of an extension of a land area occupied by an object at an intersection of a vertical line of a grid map and an outermost point by an object estimation apparatus.

As shown in FIG. 5, the grid map generator 125 may project vertical lines (VLs) based on the camera 110 model onto the grid map. The VLs may be projected on some or all points of the grid map projected onto the image. The VLs may have the same height in the actual 3D image, as shown in accompany drawings, but they may be projected as different heights at different distances in the 3D image. Furthermore, the VLs may be distorted as the image is distorted.

In other words, the VLs may be projected onto an image onto which the grid map is projected so as to have a predetermined height at points of the grid map using specific distortion coefficients of a lens of the camera 110. Here, each point of the grid map may be a point at which an upright line and a horizontal line in the grid map intersect.

The grid map generator 125 may calculate the relationship between Equation 1 and the components $(k_1, k_2, p_1, p_2, k_3)$ of the lens distortion model of the camera 110 as shown in Equation 2, and project the VLs and X, Y, Z at each vertex $X_i$, $Y_i$, $0 \rightarrow U_i$; $V_i$ of the grid map projected onto the image as the coordinates $U_n$, $V_n$ of the grip map.

$$\begin{bmatrix} x_{n\_d} \\ y_{n\_d} \end{bmatrix} = \left(1 + k_1 r_u^2 + k_2 R_u^4 + k_3 r_u^6\right)\begin{bmatrix} x_{n\_u} \\ y_{n\_u} \end{bmatrix} + \qquad \text{[Equation 2]}$$

$$\begin{bmatrix} 2p_1 x_{n\_u} y_{n\_u} + P_2\left(r_u^2 + 2x_{n\_u}^2\right) \\ P_1\left(r_u^2 + 2y_{n\_u}^2\right) + 2p_2 x_{n\_u} y_{n\_u} \end{bmatrix}$$

The grid map generator 125 may project the VLs to another KP (e.g., $X_i$, $Y_i$, 0) of the grid map that is proximate to the KP (e.g., $X_1$, $Y_1$, 0) where the object is in contact with the ground. Accordingly, the grid map generator 125 may create an occupied grid map region (OGR) at the location where the object is located by extending a region where the VLs contact the KPs arranged close proximity to (e.g., at the outermost part of) the object.

Herein, the grid map generator 125 may reduce (e.g., minimize) a time for searching the points of the grid map where the VLs and the outermost KPs of the object come into contact. For example, if the object is a human body, the grid map generator 125 may search a predetermined diameter range (e.g., 1 m) from the center of the tips of both feet of the human body. In addition, if the object is a vehicle, the grid map generator 125 may search along a line extending from two wheels of the vehicle as long as the two wheels are visible.

In addition, if the object is a human body, it may not be easy to determine the outermost points according to a specific posture. In this case, the grid map generator 125 may determine an (e.g., a maximum) occupied area for each object to generate the OGRs with the occupied area around the point of the grid map that is in contact with the ground. At this case, the grid map generator 125 may generate the OGRs in a circular shape having a predetermined diameter.

Figure 7:
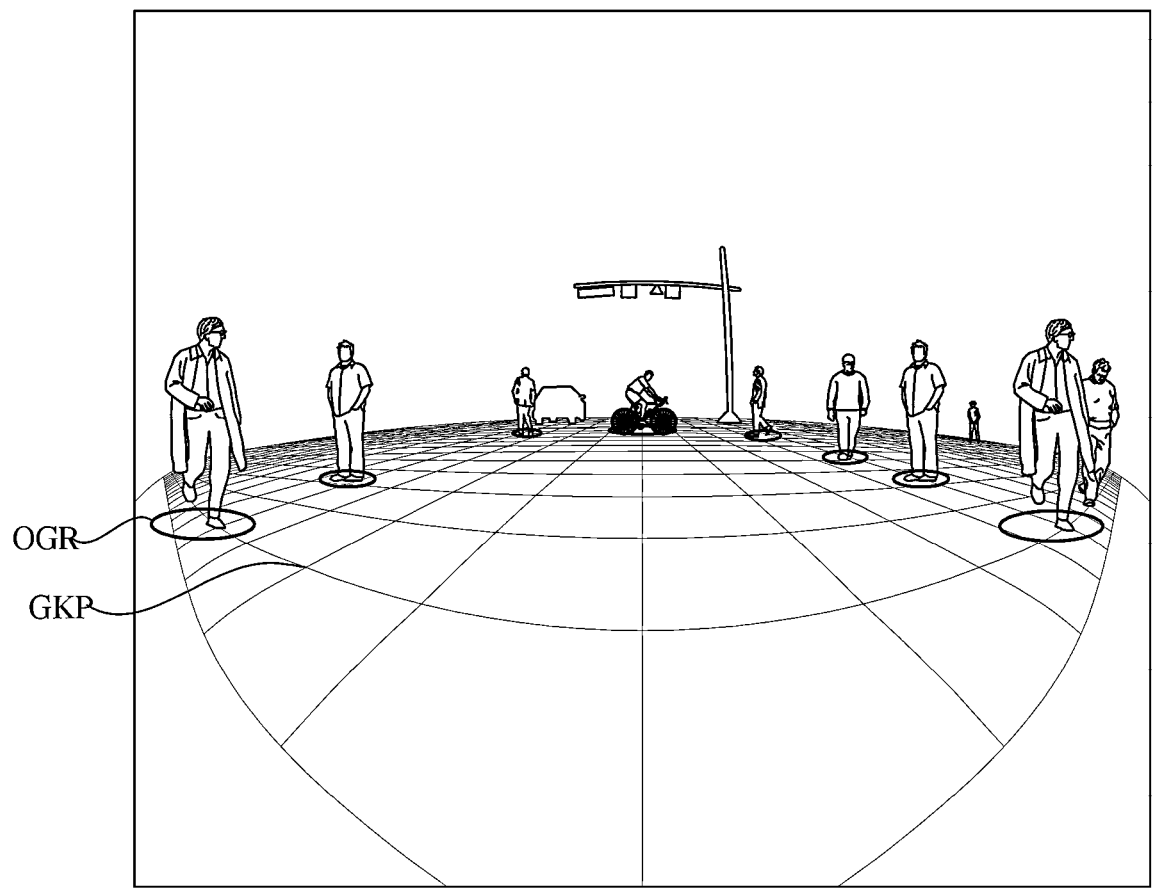
FIG. 7 shows an example of an occupied grid map region of a moving object predicted by an object estimation apparatus through a calibration and a vertical line modeling.

Consequently, as shown in FIG. 7, the grid map generator 125 may generate and display the OGR occupied by each object on the grid map. At this time, the grid map generated by the grid map generator 125 may have different coordinates and spacing for each grid depending on the size of the grid set by calibration and consideration of the resolution of the camera 110. The grid maps may also reduce positional errors by increasing the resolution of the OGR as the size of the grid decreases.

Figure 8:
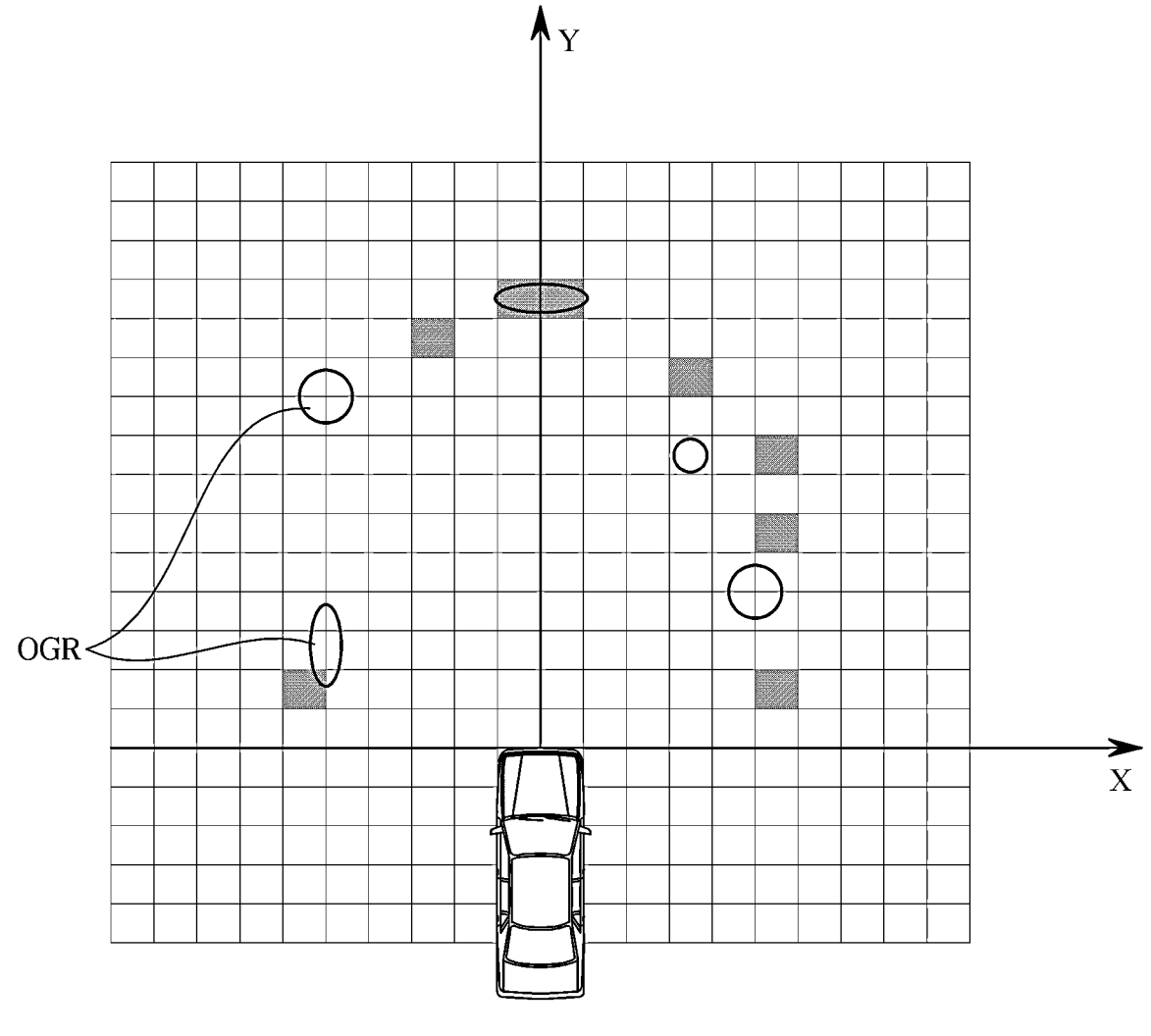
FIG. 8 shows an example of, on a plane, an occupied grid map region occupied of a moving object predicted by an object estimation apparatus through a calibration and a vertical line modeling.

Furthermore, as shown in FIG. 8, the one or more OGRs where the objects are located in the grid map based on a host vehicle may be displayed on the grid map.

Figure 9:
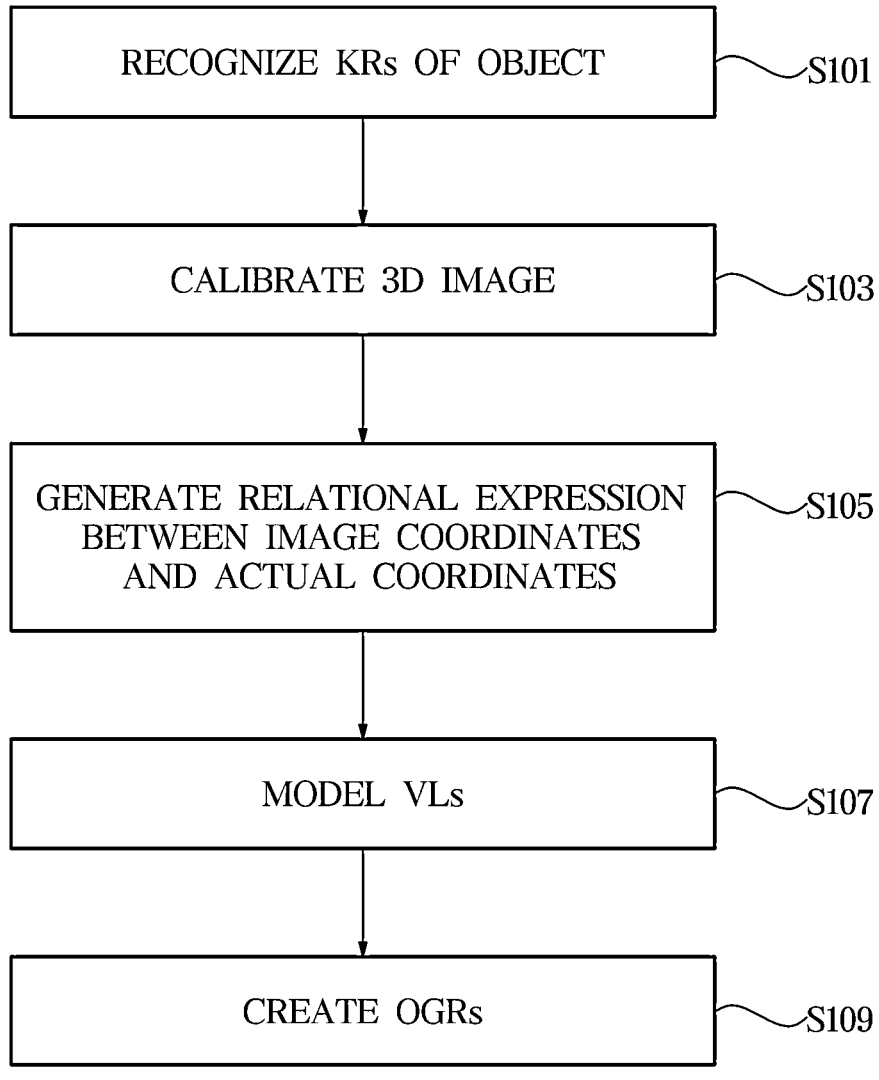
FIG. 9 shows an example of a flowchart showing steps of an object estimation method.

On the other hand, referring to FIG. 9, an object estimation method will be described. While describing the object estimation method, it will also be described with reference to FIG. 1 to FIG. 8.

The one or more KRs of the object may be recognized at S101.

The object outputter 121 of the image processor 120 may recognize the one or more KPs from the object included in the image captured by the camera 110. The one or more KPs may be set as the main points in the object. The object outputter 121 may use a key point recognition network to recognize the one or more KPs. For example, as shown in FIG. 2, 9 KPs may be set for a human body, and the 9 KPs may be set for the head, shoulders, hands, waist, and feet, respectively. In addition, as shown in FIG. 3, 12 KPs may be set for a vehicle, and for example, 4 KPs may be set at the top, 4 KPs at the middle, and 4 KPs at the bottom.

The 3D image is calibrated at S103.

The calibrator 123 may project the grid map onto a location of the 3D image corresponding to a flat surface of the 3D image of one or more objects photographed by the camera 110 by using a calibration method. Accordingly, the calibrator 123 may project the grid map onto the image as shown in FIG. 4.

The relational expression between image coordinates and actual coordinates may be generated at S105.

The calibrator 123 may set the image coordinates in the 3D image and calculate the relationship between the image coordinates and the coordinates in the actual 3D space as shown in Equation 1. Equation 1 calculates the relational expression between the image coordinates and the coordinates in the actual 3D space using unique parameter based on the camera 110 model and the values obtained through two calibration processes.

The VLs may be modelled at S107.

The grid map generator 125 may project the VLs onto the grid map based on the camera 110 model. As shown in FIG. 5, the grid map generator 125 may project the camera 110 model-based VLs onto the grid map. The VLs may be projected on some or all points of the grid map projected on the image. As shown in accompany drawings, the VLs may have the same height in the actual 3D image, but they may be projected as different heights at different distances in the 3D image.

The grid map generator 125 may calculate the relationship between Equation 1 and the components $(k_1, k_2, p_1, p_2, k_3)$ of the lens distortion model of the camera 110 as shown in Equation 2, and then project the VLs and $X_i$, $Y_i$, $Z$ at each vertex $X_i$, $Y_i$, $0 \rightarrow U_i$, $V_i$ of the grid map projected onto the image as the coordinates $U_n$, $V_n$ of the grip map.

Herein, the grid map generator 125 may reduce (e.g., minimize) a time for searching the points of the grid map that contact the outermost KPs of the object. For example, if the object is a human body, the grid map generator 125 may search a predetermined diameter range (e.g., 1 m) from the center of the tips of both feet of the human body. In addition, if the object is a vehicle, the grid map generator 125 may search along a line extending from two wheels of the vehicle as long as the two wheels are visible.

The one or more OGRs may be created at S109.

If the object is a human body, it may not be easy to determine the outermost points according to a specific posture. In this case, the grid map generator 125 may determine an (e.g., a maximum) occupied area for each object to generate the OGRs with the occupied area around the point of the grid map that is in contact with the ground. At this case, the grid map generator 125 may generate the OGRs in a circular shape having a predetermined diameter.

The present disclosure provides an object estimation apparatus and method configured for directly estimating an actual location of an object having a height from the ground.

Additional features will be set forth in part in the description which follows and, in part, will be obvious from the description, or may be learned by practice of the disclosure.

In accordance with an example of the disclosure, an object estimation apparatus includes an object outputter configured to recognize one or more key points set in one or more objects included in an image of an object photographed by a camera, a calibrator configured to calibrate the image and project a grid map onto the image, and a grid map generator configured to project vertical lines onto the grid map-projected image, and generate one or more occupied grid map region (OGRs) in the grid map with the vertical lines and the one or more key points.

The calibrator may project the grid map onto a location of the image corresponding to a ground of the image of the object photographed by the camera.

The object outputter may set one or more ground key points, contacting the ground of the image, of the one or more key points, and the calibrator may calculate a relational expression between coordinates of the image photographed by the camera and actual coordinates using a unique parameter based on a model of the camera, the ground key points, and the grid map.

The vertical line each may be projected onto a point at which a horizontal line and a vertical line of the grid map intersect.

The grid map generator may set the one or more OGRs in the grid map using a position where the vertical lines are in contact with one or more outermost key points arranged on the outermost part of the key points set in the one or more objects.

Each of the one or more OGRs may be a region formed to include the one or more outermost key points.

The object outputter may set one or more ground key points contacting a ground of the image, of the one or more key points, and the grid map generator may form the one or more OGRs in a circular shape having a predetermined diameter around midpoints of two of the ground key points.

The grid map generator may form the one or more OGRs using a line extending from two of the ground key points.

The key points each may be set at main points of the one or more objects.

In accordance with another example of the disclosure, an object estimation method includes recognizing one or more key points set in one or more objects included in an image of an object photographed by a camera, projecting a grid map onto the image, projecting vertical lines onto the grid map-projected image, and generating one or more occupied grid map region (OGRs) in the grid map with the vertical lines and the one or more key points.

The grid map may be projected onto a location of the image corresponding to a ground of the image of the object photographed by the camera.

The recognizing of the one or more key points may further include setting one or more ground key points, contacting the ground of the image, of the one or more key points.

The projecting of the grid map may further include projecting the grid map at a location, of the image, corresponding to the ground of the image of the object photographed by the camera.

The projecting of the grid map may further include calculating a relational expression between coordinates of the grid map-projected image and actual coordinates of the one or more objects using a unique parameter based on a model of the camera, the ground key points, and the grid map.

The vertical line each may be projected onto a point at which a horizontal line and a vertical line of the grid map intersect.

The one or more OGRs may be created using a position where the vertical lines are in contact with one or more outermost key points arranged on the outermost part of the key points set in the one or more objects.

Each of the one or more OGRs may be a region formed to include the one or more outermost key points.

The recognizing of the one or more key points may further include setting one or more ground key points contacting a ground of the image, of the one or more key points, and each of the one or more OGRs may have a circular shape with a predetermined diameter around midpoints of two of the ground key points.

The recognizing of the one or more key points may further include setting a ground key point contacting the ground, of the one or more key points, and each of the one or more OGRs may be created using a line extending from two of the ground key points.

The one or more key points each may be set at main points of the one or more objects.

As is apparent from the above, various examples of the present disclosure may estimate the actual position of an object having a height from the ground using calibration technologies and vertical line models, thereby estimating the actual position more accurately than the conventional method of predicting indirectly.

Further, various examples of the present disclosure may recognize the 3D structure of the object using the 2D key points recognition result, infer the regions occupied by the object in real space by selecting close proximity (e.g., the outermost) points of the object and obtaining the coordinates of the points, and indicate the OGRs by generating the vertical lines, thereby accurately estimating the actual position of the 3D object.

The above-described examples may be implemented in the form of a recording medium storing instructions executable by one or more processors of a computer or any other computing devices. The instructions may be stored in the form of program code. When the instructions are executed by a processor, a program module is generated by the instructions so that the operations of the disclosed examples may be carried out. The recording medium may be implemented as a non-transitory computer-readable recording medium.

The non-transitory computer-readable recording medium may include all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although various examples of the disclosure have been shown and described, it would be appreciated by those having ordinary skill in the art that changes may be made in the example(s) described herein without departing from the principles and spirit of the disclosure, the scope of which is defined in the claims and their equivalents.

What is claimed is:

1. An object estimation apparatus comprising:
a processor;
a memory storing instructions that, when executed by the processor, cause the object estimation apparatus to:
recognize one or more key points set in one or more objects included in an image of one or more objects photographed by a camera;
project a grid map onto the image;
project vertical lines onto the grid map-projected image; and
generate, based on the projected vertical lines and the one or more recognized key points, one or more occupied grid map region (OGRs) in the grid map.

2. The object estimation apparatus of claim 1, wherein the instructions, when executed by the processor, further cause the object estimation apparatus to:
project the grid map onto the image by projecting the grid map onto a location, of the image, corresponding to a ground of the image; and
provide the projected grid map to a vehicle for driving.

3. The object estimation apparatus of claim 2, wherein the instructions, when executed by the processor, further cause the object estimation apparatus to:
set one or more ground key points, contacting the ground of the image, of the one or more key points; and
based on a parameter associated with a model of the camera, the one or more ground key points, and the grid map, calculate a relational expression between:
image coordinates of the grid map-projected image; and
actual coordinates of the one or more objects photographed by the camera.

4. The object estimation apparatus of claim 1, wherein each of the vertical lines is projected onto a point at which a horizontal line and a vertical line of the grid map intersect.

5. The object estimation apparatus of claim 1, wherein the instructions, when executed by the processor, further cause the object estimation apparatus to set, based on a position where the vertical lines are in contact with one or more outermost key points arranged on the outermost part of the one or more recognized key points set in the one or more objects, the one or more OGRs in the grid map.

6. The object estimation apparatus of claim 5, wherein each of the one or more OGRs is a region formed to include the one or more outermost key points.

7. The object estimation apparatus of claim 5, wherein the instructions, when executed by the processor, further cause the object estimation apparatus to set one or more ground key points, contacting a ground of the image, of the one or more key points; and
form the one or more OGRs in a circular shape having a predetermined diameter around midpoints of two of the one or more ground key points.

8. The object estimation apparatus of claim 5, wherein the instructions, when executed by the processor, further cause the object estimation apparatus to form, based on a line extending from two of the one or more ground key points, contacting a ground of the image, of the one or more key points, the one or more OGRs.

9. The object estimation apparatus of claim 1, wherein each of the one or more key points is set at main points of the one or more objects.

10. An object estimation method performed by a processor, the method comprising:
recognizing one or more key points set in one or more objects included in an image of an one or more objects photographed by a camera;
projecting a grid map onto the image;
projecting vertical lines onto the grid map-projected image;
generating, based on the projected vertical lines and the one or more recognized key points, one or more occupied grid map region (OGRs) in the grid map; and
providing the projected grid map to a vehicle for driving.

11. The object estimation method of claim 10, wherein the grid map is projected onto a location, of the image, corresponding to a ground of the image.

12. The object estimation method of claim 11, wherein the recognizing the one or more key points comprises setting one or more ground key points, contacting the ground of the image, of the one or more key points.

13. The object estimation method of claim 12, wherein the projecting the grid map comprises projecting the grid map at a location, of the image, corresponding to the ground of the image.

14. The object estimation method of claim 13, wherein the projecting the grid map further comprises, based on a parameter associated with a model of the camera, the one or more ground key points, and the grid map, calculating a relational expression between:
image coordinates of the grid map-projected image; and
actual coordinates of the one or more objects photographed by the camera.

15. The object estimation method of claim 10, wherein each of the vertical lines is projected onto a point at which a horizontal line and a vertical line of the grid map intersect.

16. The object estimation method of claim 10, wherein
the one or more OGRs are generated based on a position where the vertical lines are in contact with one or more outermost key points arranged on the outermost part of the one or more recognized key points set in the one or more objects.

17. The object estimation method of claim 16, wherein each of the one or more OGRs is a region formed to include the one or more outermost key points.

18. The object estimation method of claim 16, wherein the recognizing the one or more key points comprises setting one or more ground key points, contacting a ground of the image, of the one or more key points, and
wherein each of the one or more OGRs has a circular shape with a predetermined diameter around midpoints of two of the one or more ground key points.

19. The object estimation method of claim 16, wherein the recognizing the one or more key points comprises setting one or more ground key points, contacting a ground of the image, of the one or more key points, and
wherein each of the one or more OGRs is generated based on a line extending from two of the one or more ground key points.

20. The object estimation method of claim 10, wherein each of the one or more key points is set at main points of the one or more objects.

* * * * *